(12) United States Patent
Salter et al.

(10) Patent No.: US 12,259,253 B2
(45) Date of Patent: Mar. 25, 2025

(54) VEHICLE GUIDANCE

(71) Applicant: Ford Global Technologies, LLC, Dearborn, MI (US)

(72) Inventors: Stuart C. Salter, White Lake, MI (US); Pietro Buttolo, Dearborn Heights, MI (US); William H. Wurz, San Francisco, CA (US); Hussein H. Berry, Dearborn, MI (US); David Kennedy, Canton, MI (US); Kenneth Mchugh, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 384 days.

(21) Appl. No.: 17/472,892

(22) Filed: Sep. 13, 2021

(65) Prior Publication Data
US 2023/0078320 A1    Mar. 16, 2023

(51) Int. Cl.
   *G01C 21/00*    (2006.01)
   *G01C 21/36*    (2006.01)

(52) U.S. Cl.
   CPC ..... *G01C 21/3641* (2013.01); *G01C 21/3602* (2013.01); *G01C 21/3629* (2013.01); *G01C 21/3647* (2013.01); *G01C 21/3691* (2013.01)

(58) Field of Classification Search
   CPC ............. G01C 21/364; G01C 21/3602; G01C 21/3629; G01C 21/3647; G01C 21/3691
See application file for complete search history.

(56) References Cited

U.S. PATENT DOCUMENTS

| | | | |
|---|---|---|---|
| 9,653,001 B2 | 5/2017 | Mughal et al. | |
| 9,766,625 B2 | 9/2017 | Boroditsky et al. | |
| 11,112,791 B2 * | 9/2021 | Bhanushali | H04N 19/167 |
| 11,303,621 B2 * | 4/2022 | Beaurepaire | G01C 21/36 |
| 11,492,002 B2 * | 11/2022 | Kim | G07C 5/008 |
| 2014/0067265 A1 * | 3/2014 | Maston | G01C 21/3697 340/905 |
| 2015/0066258 A1 * | 3/2015 | Loftus | B60L 58/12 701/22 |
| 2016/0003621 A1 * | 1/2016 | Koenig | G07C 5/008 |
| 2016/0084661 A1 | 3/2016 | Gautama et al. | |
| 2016/0291592 A1 * | 10/2016 | Matthews | G06T 3/0012 |
| 2017/0215031 A1 * | 7/2017 | Harding | G01C 21/3667 |
| 2020/0003564 A1 * | 1/2020 | Zhang | G01C 21/3602 |

(Continued)

FOREIGN PATENT DOCUMENTS

WO    2021001576 A1    1/2021

*Primary Examiner* — Truc M Do
(74) *Attorney, Agent, or Firm* — Frank Lollo; Brooks Kushman P.C.

(57) ABSTRACT

A system includes a first vehicle computer programmed to monitor first vehicle sensor data as the first vehicle traverses a route; identify a location of interest along the route based on a topographic feature of the location of interest determined from the first vehicle sensor data; and store a selected subset of the first vehicle sensor data for the location of interest in a set of collected data about the route. The system further includes a second computer programmed to receive the collected data about the route; and based on the collected data about the route, generate a set of guidance data including one or more recommended operating parameters for the location of interest, whereby the recommending operating parameters are available to a third computer for a second vehicle.

19 Claims, 5 Drawing Sheets

(56) References Cited

U.S. PATENT DOCUMENTS

| | | |
|---|---|---|
| 2020/0132453 A1* | 4/2020 | Ho .................. G01C 21/30 |
| 2020/0202196 A1* | 6/2020 | Guo .................. G06N 3/042 |
| 2020/0242968 A1 | 7/2020 | Gaither et al. |
| 2020/0249035 A1* | 8/2020 | Gitz .................. G01C 21/3614 |
| 2022/0125032 A1* | 4/2022 | Ascherl .............. A01M 7/0089 |

* cited by examiner

VEHICLE GUIDANCE

BACKGROUND

Ground vehicles can be operated on a variety of surfaces and terrains. For example, a ground vehicle with two or more wheels can be operated in an off-road environment. In such an environment, the vehicle can encounter a varied topography and/or obstacles such a rocks, boulders, and plants. A varied surface or terrain can present challenges to operating a vehicle efficiently.

DETAILED DESCRIPTION

Overview

Figure 1:
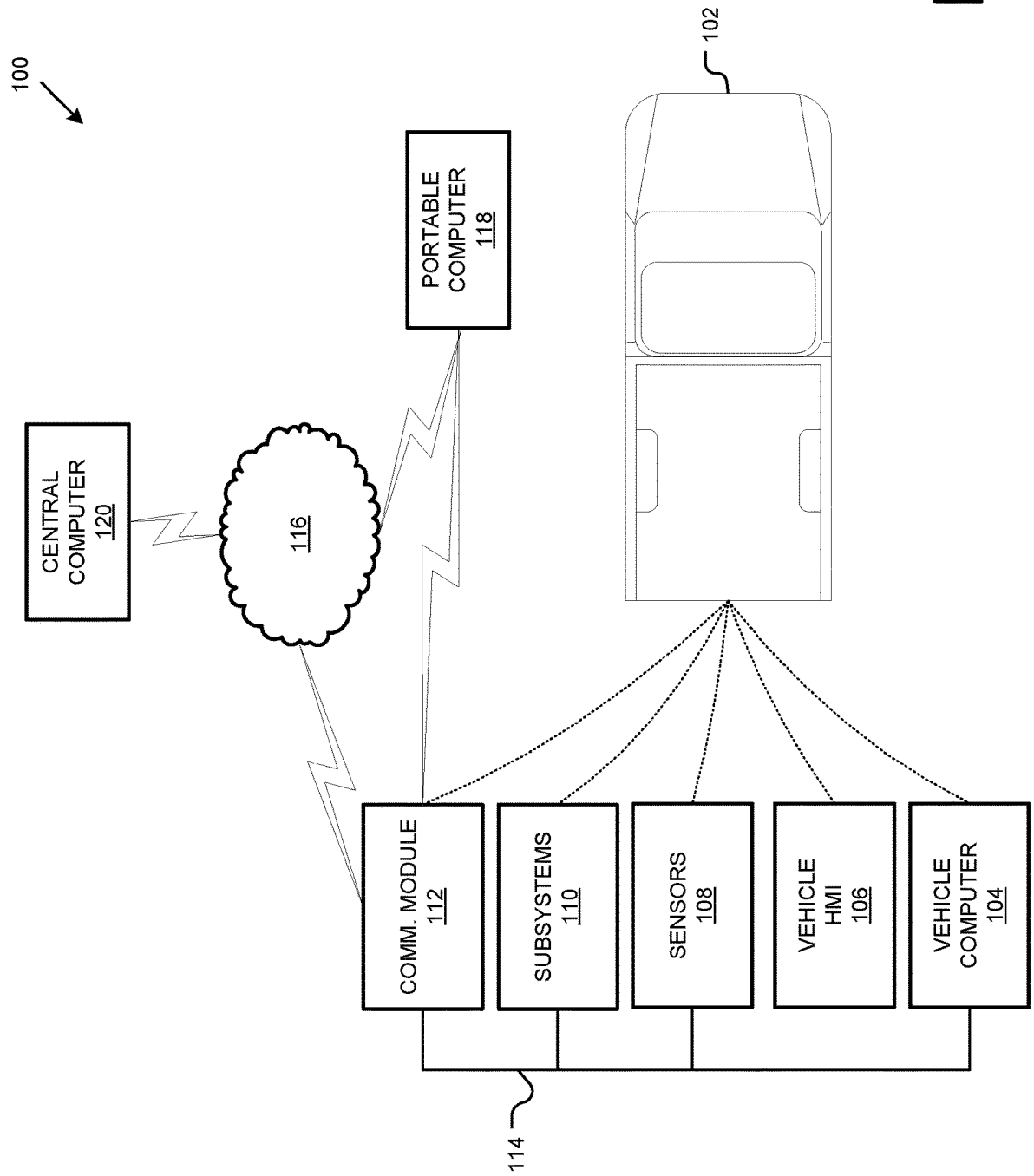
FIG. 1 is a block diagram of a vehicular topographic management system.

FIG. 1 is a block diagram a vehicular topographic management system 100 to support operations of one or more vehicles 102, and can include the vehicles 102 and other elements as will now be discussed. In general, a first vehicle 102 traversing a route can gather sensor data along the route both about an environment around the vehicle 102 and the vehicle 102. The sensor data can be provided to a first vehicle computer 104. The computer can identify a location of interest along the route based on a map and/or a topographic feature of the location of interest determined from the vehicle sensor data. The first vehicle computer 104 can then store a selected subset of the first vehicle sensor data for the location of interest in a set of collected data about the route. A second, central computer 120 can receive the collected data about the route and then, based on the collected data about the route, generate a set of guidance data including one or more recommended operating parameters for the location of interest, whereby the recommending operating parameters are available to a vehicle computer 104 in a second vehicle 102. The second vehicle 102 can then utilize the guidance data when traversing the route.

A comprises a first computer for a first vehicle comprising a first computer processor and a first computer memory. The first computer memory can store first instructions executable by the first computer processor to: monitor first vehicle sensor data as the first vehicle traverses a route; identify a location of interest along the route based on a topographic feature of the location of interest determined from the first vehicle sensor data; and store a selected subset of the first vehicle sensor data for the location of interest in a set of collected data about the route. The system can further comprise a second computer comprising a second computer processor and a second computer memory. The second computer memory can store second instructions executable by the second computer processor to receive the collected data about the route; and based on the collected data about the route, generate a set of guidance data including one or more recommended operating parameters for the location of interest, whereby the recommending operating parameters are available to a third computer for a second vehicle.

The selected subset of the first vehicle sensor data for the location of interest can be selected based on the topographic feature of the location of interest determined from the first vehicle sensor data. The topographic feature at the location of interest can be user input received for the location of interest via a microphone, touchscreen, or camera in the vehicle. The first computer further can further include first instructions to, upon identifying the location of interest, output a prompt for a vehicle occupant to input data about the location of interest. The topographic feature at the location of interest can be determined from at least one of accelerometer data, wheel slip data, all-wheel drive data, steering angle, throttle position, gear selection, wheel-load, rain sensor data, or drive train torque. The selected subset of the vehicle sensor data can include at least one of a location coordinate of the location of interest, and a camera image including the location of interest. The selected subset of the vehicle sensor data can include at least one of accelerometer data, wheel slip data, all-wheel drive data, steering angle, tire size, tire type, tire pressure, throttle position, gear selection, wheel-load, drive train torque, a state of charge of an traction battery, or a temperature of a traction battery. The recommended operating parameters can include at least one of speed, steering angle, gear selection, throttle position, and a path including the location of interest.

The first computer can further include second instructions to identify a second location of interest, in addition to the first location of interest, based on a second topographic feature of the second location of interest determined from the first vehicle sensor data. The second computer can further include second instructions to, based on the collected data about the route, include in the guidance data a set of one or more recommended operating parameters for the second location of interest. The second location of interest can be one of a plurality of second locations of interest. The second computer can further include second instructions to provide a user interface to include in the guidance data an association of the recommended operating parameters with the location of interest. The second computer can further include second instructions to provide a user interface to receive user input about the location of interest for inclusion in the guidance data.

The system can further comprise the third computer for the second vehicle, including a third computer processor and a third computer memory. The third computer memory can store third instructions executable by the third computer processor to: store the guidance data for the route; and provide output in the second vehicle based on the guidance data as the second vehicle travels along the route. The output in the second vehicle can be based on one or more of the recommended operating parameters. The output in the second vehicle can include a steering angle based on the recommended operating parameters and a current steering angle, and/or a suggested path for the second vehicle based on the one or more recommended operating parameters, and/or a recommendation based on one or both of a traction battery state of charge and a traction battery temperature included in the recommended operating parameters. The output in the second vehicle can be provided via a human-machine interface in the second vehicle, and/or provided via an operator control in the second vehicle.

System Elements

A vehicle 102 may be any suitable type of ground vehicle 102, e.g., a passenger or commercial automobile such as a sedan, a coupe, a truck, a sport utility, a crossover, a van, a minivan, a taxi, a bus, etc. A vehicle 102 can include one or more vehicle computers 104. A vehicle computer 104 can accept input and/or provide output via a human-machine interface or HMI 106 included in a vehicle 102. The vehicle computer 104 as well as various vehicle subsystems 110 in the vehicle 102 can make use of various sensors 108 and, or a communication module 112, which can variously communicate via a vehicle network 114.

Computers, including the herein-discussed vehicle computer 104, portable computer 118, and central computer 120, typically includes a processor and a memory. The memory includes one or more forms of computer readable media, and stores instructions executable by the computer for performing various operations, including as disclosed herein. For example, a computer can be a generic computer with a processor and memory as described above and/or may include an electronic control unit ECU or controller for a specific function or set of functions, and/or a dedicated electronic circuit including an ASIC that is manufactured for a particular operation, e.g., an ASIC for processing sensor data and/or communicating the sensor data. In another example, a computer may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems 100 such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in a computer.

The memory can be of any type, e.g., hard disk drives, solid state drives, servers, or any volatile or non-volatile media. The memory can store the collected data sent from the sensors 108. The memory can be a separate device from a computer. A vehicle computer 104 typically can retrieve information stored by the memory via a network in the vehicle 102, e.g., over a CAN bus, a wireless network, etc., and other computers could alternatively or additionally be connected to the vehicle network 114. Alternatively or additionally, the memory can be part of the computer.

A vehicle computer 104 may include programming to operate one or more vehicle subsystems 110, e.g., one or more of vehicle 102 brakes, propulsion e.g., control of acceleration in the vehicle 102 by controlling one or more of an internal combustion engine, electric motor, hybrid engine, etc., steering, climate control, interior and/or exterior lights, etc., as well as to determine whether and when the computer, as opposed to a human operator, is to control such operations. Additionally, the computer may be programmed to determine whether and when a human operator is to control such operations.

As mentioned above, a vehicle computer 104 is generally arranged for communications on a vehicle 102 communication network that can include a bus in the vehicle 102 such as a controller area network CAN or the like, and/or other wired and/or wireless mechanisms. Thus, a vehicle computer 104 may include or be communicatively coupled to, e.g., via a vehicle network 114 such as a communications bus as described further below, more than one processor, e.g., included in components such as sensors 108, electronic control units (ECUs) or the like included in the vehicle 102 for monitoring and/or controlling various vehicle components, e.g., a powertrain controller, a brake controller, a steering controller, etc. Alternatively or additionally, in cases where the computer actually comprises a plurality of devices, the vehicle 102 communication network may be used for communications between devices represented as the computer in this disclosure. Further, as mentioned below, various controllers and/or sensors 108 may provide data to the computer via the vehicle 102 communication network.

The vehicle 102 can include an HMI (human-machine interface) 106, e.g., one or more of a display, a touchscreen display, a microphone, a speaker, etc. The user can provide input to devices such as a vehicle computer 104 via the HMI 106. The HMI 106 can communicate with a computer via the vehicle network 114, e.g., the HMI 106 can send a message including the user input provided via a touchscreen, microphone, a camera that captures a gesture, etc., to a computer, and/or can display output, e.g., via a screen, speaker, etc.

Vehicles 102, such as autonomous or semi-autonomous vehicles 102, typically include a variety of sensors 108. A sensor 108 is a device that can obtain one or more measurements of one or more physical phenomena. Some sensors 108 detect internal states of the vehicle 102, for example, wheel speed, wheel orientation, and engine and transmission variables. Some sensors 108 detect the position or orientation of the vehicle 102, for example, global positioning system 100 GPS sensors 108; accelerometers such as piezoelectric or microelectromechanical systems 100 MEMS; gyroscopes such as rate, ring laser, or fiber-optic gyroscopes; inertial measurements units IMU; and magnetometers. Some sensors 108 detect the external world, for example, radar sensors 108, scanning laser range finders, light detection and ranging LIDAR devices, and image processing sensors 108 such as cameras. A LIDAR device detects distances to objects by emitting laser pulses and measuring the time of flight for the pulse to travel to the object and back. Some sensors 108 are communications devices, for example, vehicle-to-infrastructure V2I or vehicle-to-vehicle V2V devices. Sensor 108 operation can be affected by obstructions, e.g., dust, snow, insects, etc. Often, but not necessarily, a sensor 108 includes a digital-to-analog converter to converted sensed analog data to a digital signal that can be provided to a digital computer, e.g., via a network. Sensors 108 can include a variety of devices, and can be disposed to sense and environment, provide data about a machine, etc., in a variety of ways. Moreover, various controllers in a vehicle 102 may operate as sensors 108 to provide data via the vehicle network 114 or bus, e.g., data relating to vehicle 102 speed, acceleration, location, subsystem and/or component status, etc. Further, other sensors 108, in or on a vehicle 102, stationary infrastructure element, etc., infrastructure could include cameras, short range radar, long range radar, LIDAR, and/or ultrasonic transducers, weight sensors 108, accelerometers, motion detectors, etc., i.e., sensors 108 to provide a variety of data. To provide just a few non-limiting examples, sensor data could include data for determining a position of a component, a location of an object, a speed of an object, a type of an object, a slope (or incline) of a roadway, a temperature, an presence or amount of moisture, a fuel level, a data rate, etc.

A vehicle subsystem 110 is a set of components or parts, including hardware components and typically also software and/or programming, to perform a function or set of operations in the vehicle 102. Vehicle subsystems 110 typically include, without limitation, a braking system 100, a propulsion system 100, and a steering system 100. The propulsion subsystem converts energy to rotation of vehicle 102 wheels to propel the vehicle 102 forward and/or backward. The braking subsystem can slow and/or stop vehicle 102 movement. The steering subsystem can control a yaw, e.g., turning left and right, maintaining a straight path, of the vehicle 102 as it moves.

A vehicle computer 104 may be configured for communicating via a vehicle 102 to vehicle 102 communication module 112 or interface with devices outside of the vehicle 102, e.g., through vehicle 102 to vehicle 102 V2V, vehicle-to-infrastructure or everything V2X or vehicle-to-everything including cellular communications C-V2X wireless communications cellular, DSRC, etc., to another vehicle 102, to an infrastructure element typically via direct radio frequency communications and/or typically via the network a remote server. The module could include one or more mechanisms by which the computers of vehicles 102 may communicate, including any desired combination of wireless e.g., cellular, wireless, satellite, microwave and radio frequency communication mechanisms and any desired network topology or topologies when a plurality of communication mechanisms are utilized. Exemplary communications provided via the communication module 112 can include cellular, Bluetooth, IEEE 802.11, dedicated short range communications DSRC, cellular V2X CV2X, and the like.

The vehicle network 114 is a network via which data, typically messages comprising one or more packets or the like, can be exchanged between various devices in vehicle 102. A vehicle computer 104 can be generally programmed to send and/or receive, via vehicle network 114, messages to and/or from other devices in vehicle 102 e.g., any or all of ECUs, sensors 108, actuators, components, communications module, a human machine interface HMI 106, etc. Additionally or alternatively, messages can be exchanged among various such other devices in vehicle 102 via vehicle network 114. In cases in which computer actually comprises a plurality of devices, vehicle network 114 may be used for communications between devices represented as computer in this disclosure. Further, as mentioned below, various controllers and/or vehicle 102 sensors 108 may provide data to the computer. In some implementations, vehicle network 114 can be a network in which messages are conveyed via a vehicle 102 communications bus. For example, vehicle network 114 can include a controller area network CAN in which messages are conveyed via a CAN bus, or a local interconnect network LIN in which messages are conveyed via a LIN bus. In some implementations, vehicle network 114 can include a network in which messages are conveyed using other wired communication technologies and/or wireless communication technologies e.g., Ethernet, WiFi®, Bluetooth®, etc. Additional examples of protocols that may be used for communications over vehicle network 114 in some implementations include, without limitation, Media Oriented System 100 Transport MOST, Time-Triggered Protocol TTP, and FlexRay. In some implementations, vehicle network 114 can represent a combination of multiple networks, possibly of different types, that support communications among devices in vehicle 102. For example, vehicle network 114 can include a CAN in which some devices in vehicle 102 communicate via a CAN bus, and a wired or wireless local area network in which some device in vehicle 102 communicate according to Ethernet or Wi-Fi communication protocols.

A computer can be programmed to communicate with one or more remote sites such as a central computer 120, via a wide area network 116. The wide area network 116 can include one or more mechanisms by which a vehicle computer 104 may communicate with, for example, a central computer 120. Accordingly, the wide area network 116 can include one or more of various wired or wireless communication mechanisms, including any desired combination of wired e.g., cable and fiber and/or wireless e.g., cellular, wireless, satellite, microwave, and radio frequency communication mechanisms and any desired network topology or topologies when multiple communication mechanisms are utilized. Exemplary communication networks include wireless communication networks e.g., using Bluetooth, Bluetooth Low Energy BLE, IEEE 802.11, vehicle-to-vehicle V2V or vehicle 102 to everything V2X such as cellular V2X (CV2X), Dedicated Short Range Communications DSRC, etc., local area networks and/or wide area networks, including the Internet, providing data communication services.

A smartphone, tablet, or other suitable portable computing device could comprise a portable computer 118. A portable computer 118 can include various sensors 108 such as one or more cameras, an accelerometer, and a location sensor 108, e.g., to determine a location according to the Global Positioning System 100 (GPS), a microphone, etc. A portable device could use any suitable wireless communications, such as cellular or WI-FI, to communicate with a central computer 120 via a wide area network 116.

Further, as mentioned above, the system 100 could include one or more central computers 120 accessible via the wide area network 116.

System Operation

In the context of the system 100, a first vehicle computer 104 (i.e., a computer in a first vehicle 102) can obtain data about a route. A "route" herein is a set of locations over or on which a vehicle 102 travels from a first location, generally referred to as the origin of the route, to a second location, generally referred to as the destination of the route. The first vehicle 102 can determine that it is at or proximate to, i.e., within a specified distance of, a route origin, and can then monitor first vehicle 102 sensor data as the first vehicle 102 traverses, i.e., travels along, the route. Further, the first vehicle computer 104 can identify a location of interest along the route based on one or more trigger events. A location of interest can be specified according to conventional mechanisms for identifying ground locations, e.g., geo-coordinates or the like. For example, a first vehicle computer, upon identifying a trigger event, could store geo-coordinates at which the trigger event was identified.

A trigger event in the present document means a datum or data included in vehicle sensor data matching a predefined value and/or falling below, or exceeding, a specified threshold. For example, a trigger event could be identified by input of a user in a vehicle 102 traversing a route. Alternatively or additionally, thresholds for various sensor data are defined to indicate locations of interest, i.e., trigger event could be identified indicating a location of interest when sensor data fell below or exceeded a threshold. For example, a steering angle threshold could be defined to indicate a location of interest based on the absolute value of a vehicle 102 steering angle exceeding a threshold. A speed threshold could be defined based on a vehicle 102 speed fallen below or above a speed threshold. The suspension threshold could be defined based on a displacement of one or more vehicle 102 wheels being above a specified threshold. Many other examples are possible. Moreover, thresholds could be combined to define trigger events. For example, a vehicle suspension displacement above a specified threshold in combination with a speed above a specified threshold could be a trigger event.

Further, a trigger event could include identifying a topographic feature of the location of interest determined from stored map data and/or first vehicle sensor data such as user input to a microphone sensor 108 in the vehicle HMI 106 or location data from a location sensor 108 indicating a location associated with a topographic feature in map data. Yet further alternatively or additionally, a trigger event could include identifying a topographic feature based on vehicle sensor data such as image data that is used according to image recognition techniques to identify a topographic features such as a boulder, a pothole, etc.

The vehicle computer 104 can then store a selected subset of the first vehicle 102 sensor data for the location of interest in a set of collected data about the route. The collected data from the first vehicle 102 can then be provided to a second computer, such as the central computer 120 mentioned above, to generate a set of guidance data for a second vehicle 102 that may traverse the route based on the collected data about the route from the first vehicle 102. The set of guidance data includes one or more recommended operating parameters for the location of interest, whereby the recommending operating parameters are available to for a vehicle computer 104 (sometimes referred to here for clarity of reference as the third computer or third vehicle computer 104) in the second vehicle 102.

The first vehicle computer 104 can identify the location of interest along the route based on the topographic feature of the location of interest determined from first vehicle 102 sensor data as mentioned above. In one example, the vehicle 102 sensor data includes user input to a microphone sensor 108 in the vehicle HMI 106 and location sensor data, where the user input, e.g., voice input, a gesture detected by a camera, or input to a touchscreen, specifies that a vehicle 102 is at a location of interest, and the vehicle computer 104 then stores the current location of the vehicle 102 specified based on location sensor data along with the indication from the user input that the current location is a location of interest. The user input could also specify a type of the topographic feature at the location of interest, e.g., bump, boulder, shrub, wall, hole, steep incline, etc. The type of topographic feature could be provided in response to a prompt output via the HMI 106 for a vehicle 102 occupant to input data about the location of interest.

Alternatively or additionally, a vehicle computer 104 could include programming to identify one or more locations of interest based on vehicle 102 sensor data indicating that the vehicle 102 was traversing terrain, i.e., passing through or over a location, having a topographic feature meeting or exceeding a defined threshold or thresholds. Moreover, the first vehicle 102 data could be used to determine operating parameters, i.e., data values that describe a state or states of a vehicle 102, vehicle subsystems 110 and/or components thereof. For example, first vehicle 102 sensor data could include data used to determine operating parameters. For example, a first vehicle 102 speed, gear ratio, wheel slip ratio, etc., at a specified location along a route could be provided as one or more operating parameters in guidance data.

Where one or more second locations of interest are identified, in addition to a first location of interest, the second locations of interest are identified based on respective based second topographic features of the second locations of interest determined from the first vehicle sensor data. A topographic feature in this context means a feature of a ground surface, such as a rate of incline, an upward or downward displacement at a specified location, e.g., due to a boulder, shrub, or pothole, etc.

Sensor data to determine a topographic feature could include one or more of accelerometer data, wheel slip data, all-wheel drive data, steering angle, throttle position, gear selection, wheel-load, rain sensor data, or drivetrain torque. Examples of one or more thresholds for sensor data could include a rate of incline of a travel surface, a displacement of a vehicle 102 suspension for one or more wheels, a rate of speed, a gear ratio, a wheel-slip ratio, etc. Vehicle 102 sensors 108 could include an inclinometer, accelerometer, speed sensor 108, torque sensor 108, etc., to measure incline of a surface the vehicle 102 is traversing, changes in, i.e., displacements of, vehicle 102 suspension for one or more wheels, rates of speed or acceleration, drivetrain torque, etc., all of which are further examples of data that could be provided as operating parameters in guidance data, Alternatively or additionally, sensor data to identify a topographic feature indicating a location of interest could include a camera image including the location of interest, e.g., image recognition techniques could be used to identify topographic features such as a wall, a curb, boulders, shrubs, etc.

Moreover, once one or more locations of interest are identified, the selected subset of the first vehicle 102 sensor data for the respective locations of interest, to be used by the central computer 120 in generating the guidance data, can be selected based on the topographic feature of the location(s) of interest determined from the first vehicle 102 sensor data. The selected subset of the vehicle 102 sensor data includes at least one of accelerometer data, wheel slip data, all-wheel drive data, steering angle, tire size, tire type, tire pressure, throttle position, gear selection, wheel-load, drive train torque, a state of charge of a traction battery, or a temperature of a traction battery. For example, a vehicle computer 104 in a first vehicle 102 collecting sensor data about locations of interest could be programmed to provide to a central computer 120 sensor data for a time range including a time before and after the first vehicle 102 traverses a location of interest, e.g., a time thirty seconds before the vehicle 102 reaches the location of interest through a time thirty seconds after the vehicle 102 had departed the location of interest. Alternatively or additionally, a first vehicle computer 104 could provide a stream of data collected while a route is traversed to a central computer 120, along with coordinates or the like for locations of interest on the route. The central computer 120 could then execute programming to extract the first vehicle 102 collected data pertaining to respective locations of interest.

Figure 2:
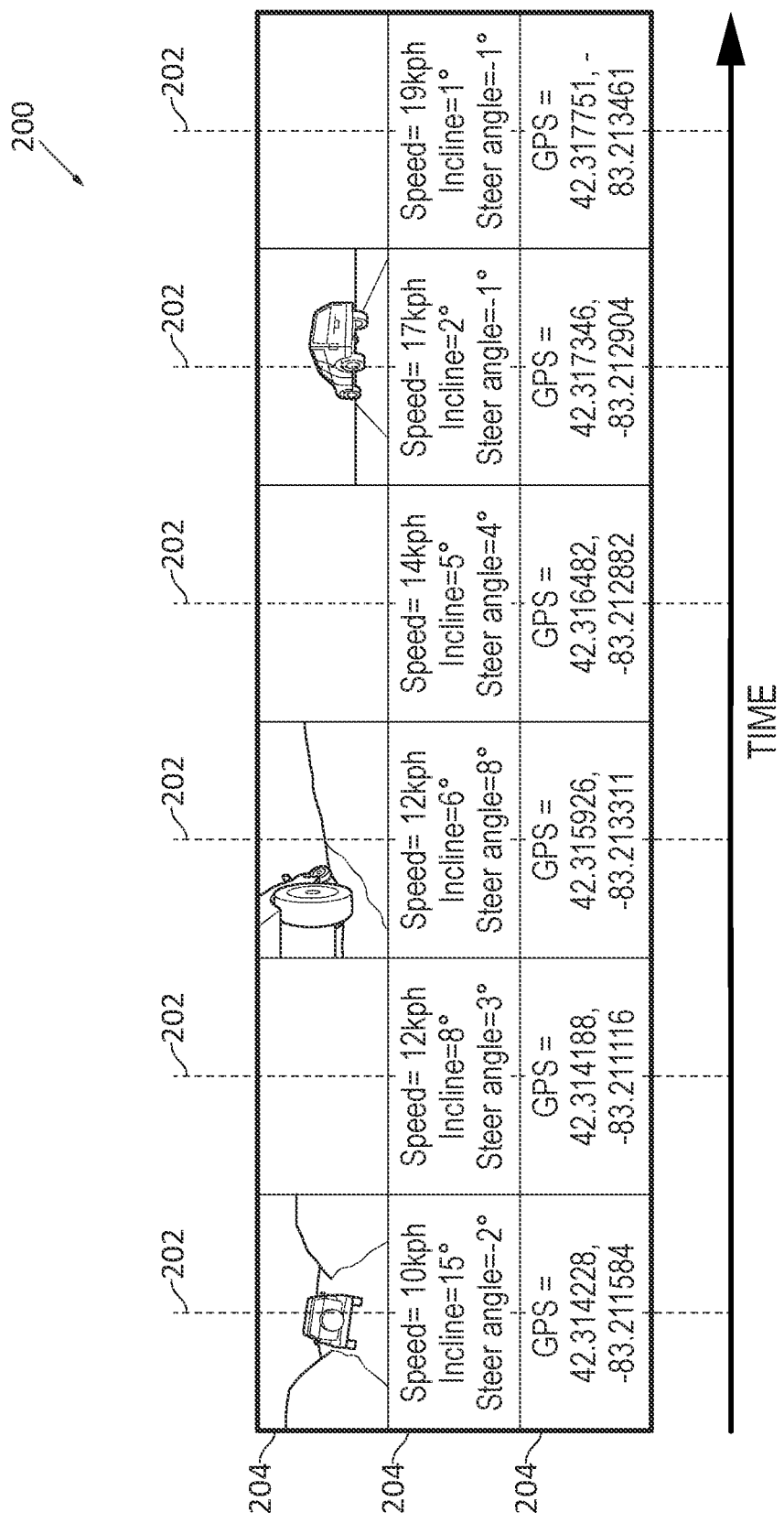
FIG. 2 illustrates an example user interface for generating guidance data.

Yet further alternatively or additionally, as illustrated in FIG. 2, a central computer 120 could be programmed to provide a user interface 200 for providing input to generate guidance data. Input to the user interface 200 can specify recommended operating parameters for a route, i.e., for one or more locations of interest on a route. That is, input to the user interface 200 can specify an association of operating parameters with a location of interest for inclusion in the guidance data, the operating parameters being recommended physical values according to which a vehicle 102 traversing a route is to be operated. Example operating parameters are provided above could additionally or alternatively include at least one of speed, steering angle, gear selection, throttle position, and a path including the location of interest. A "path" herein means a set of locations over which a vehicle travels, such as a set of locations covered from an origin or a route to a destination of the route. Thus, points on a path could be points on a route, but more likely points on a vehicle path will be near, but not exactly the same as, points on a route.

The user interface 200 could display collected data about a route from a first vehicle 102 for respective time indices 202 at which the data was collected while the first vehicle 102 traversed the route. Various subsets of or types of the selected collected data could be displayed in respective rows or ribbons 204 in the user interface 200. In the example of FIG. 2, a top ribbon 204 displays image data. A middle ribbon 204 displays vehicle 102 speed, path incline, and vehicle 102 steering angle. A bottom ribbon 204 displays vehicle 102 location at the respective time index 202. A user could provide input to select data in one or more of the ribbons 204 (and/or other data collected from a route) at a respective time index 202 as guidance data for a location of interest associated with the time index 202. Alternatively or additionally, a user could provide input specifying operating parameters or other data, such as a voice or text annotation (e.g., "boulder ahead; maximum speed 10 mph," etc.) to be included in guidance data for a location of interest. Yet further alternatively or additionally, specified operating parameters for a location of interest could be based on first vehicle 102 sensor data recorded at the location of interest.

Guidance data, once generated based on a first vehicle 102 traversing a route and/or according to input via a central computer 120, can then be provided to a second vehicle 102 that may traverse the route. The second vehicle computer 104 can store the guidance data for the route, and can then provide output in a second vehicle HMI 106 based on the guidance data as the second vehicle 102 travels along the route. For example, the output could be based on one or more of the recommended operating parameters, e.g., specifying a recommended speed, gear, steering angle, etc.

Figure 3:
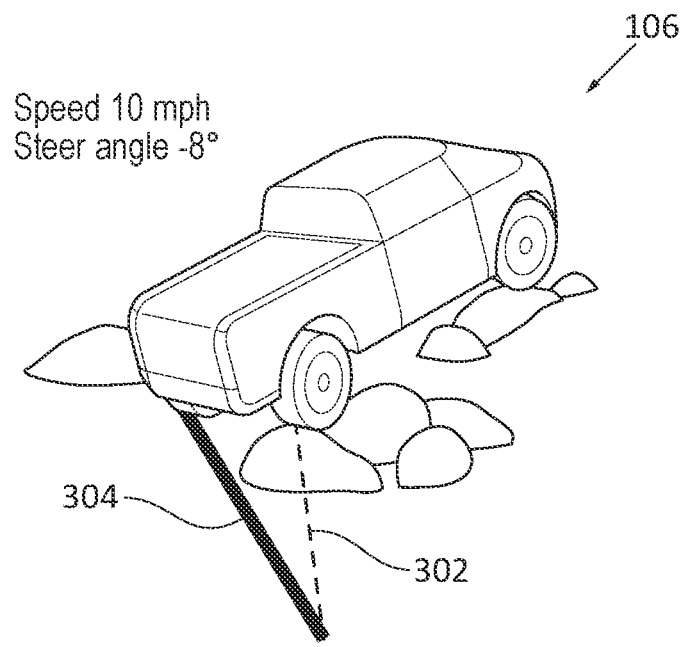
FIG. 3 illustrates an example vehicle human machine interface display.
Figure 4:
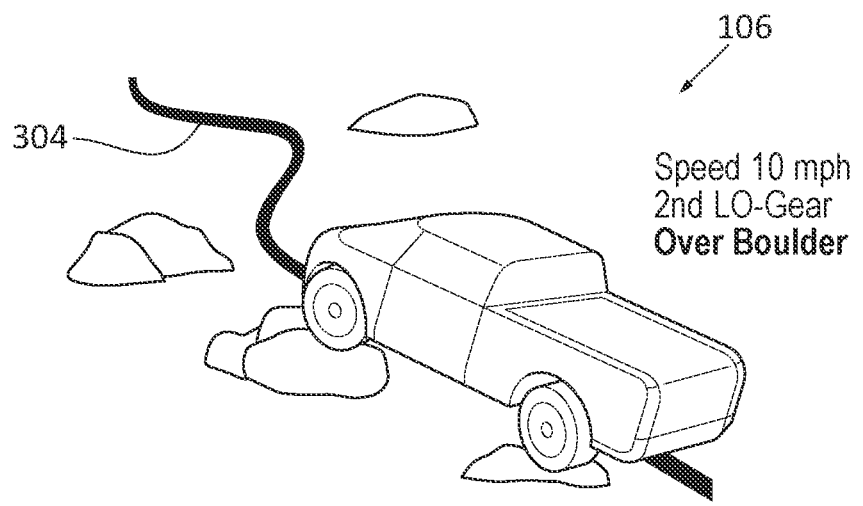
FIG. 4 illustrates another example vehicle human machine interface display.

Yet further, the HMI 106 in a second vehicle 102 could include a recommended operating parameter from guidance data along with second vehicle sensor data indicating a current state of the second vehicle 102. For example, as illustrated in FIG. 3, the HMI 106 output could include a steering angle based on the recommended operating parameters and a current steering angle. Further, the HMI 106 could display an actual projected current path 302 of the vehicle 102, e.g., based on a current speed and steering angle, as well as a recommended path 304 which, in this example, would require the recommended speed and steering angle. Recommended operating parameters could be based on a variety of additional or alternative data. For example, a vehicle 102 speed or path could be based at least in part on one or both of a traction battery state of charge and a traction battery temperature included in the recommended operating parameters. FIG. 4 illustrates another example vehicle 102 human machine interface display in which a recommended path 304 and other recommended operating parameters are displayed on the vehicle HMI 106.

Example Processes

Figure 5:
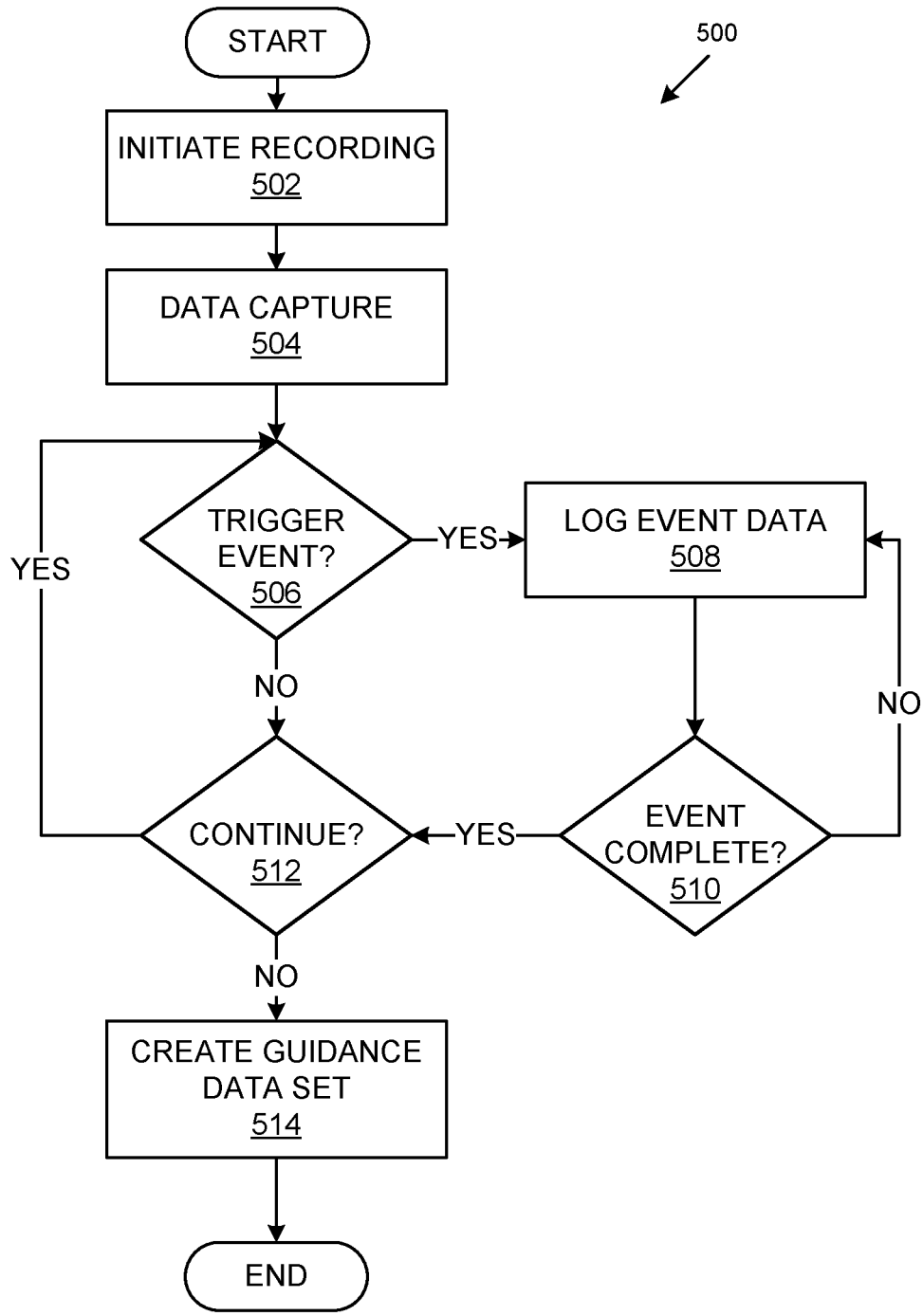
FIG. 5 illustrates an example process for creating a set of data about a route and then generating guidance data bout the route.

FIG. 5 illustrates an example process 500 for creating a set of data about a route that can then be used to generate guidance data for the route.

The process 500 can begin in a block 502, in which recording of vehicle sensor data is initiated in a first vehicle computer 104. For example, user input could be provided via a vehicle HMI 106 to initiate recording of specified sensor data, e.g., speed, steering angle, location, etc., of the first vehicle 102, as discussed above. Typically, a route is specified, e.g., according to a starting point (or origin) and ending point (or destination) or alternatively a starting point or origin location of a route can be stored, and an ending point or destination location can be determined based on user input, for example, specifying that traversal of the road has been completed.

Next, in a block 504, the vehicle computer 104 captures sensor data (and may also check map data, as described above).

Next, in a decision block 506, the vehicle computer 104 determines whether a trigger event is identified as described above. If a trigger event is identified, then the process 500 proceeds to a block 508. Otherwise, the process 500 proceeds to a block 512.

In the block 508, the vehicle computer 104 logs sensor data for the event. For example, as explained above, the vehicle computer 104 could record sensor data along with data specifying a location and/or time at which the data was recorded. In one example, the vehicle computer 104 could simply log a predefined set of data upon identifying any event, e.g., a vehicle 102 speed, a vehicle 102 steering angle, a vehicle 102 gear selection and/or gear ratio, a wheel slip, etc. In another example, a specified type of event would trigger recording vehicle sensor data specific for that event. For example, detecting a steep rocky incline could trigger recording a vehicle 102 gear ratio and wheel slip. Other events could trigger other combinations of sensor data being recorded or logged.

In a decision block 510 following the block 508, the vehicle computer 104 determines whether the triggered event is complete. For example, the vehicle computer 104 could determine that the vehicle 102 is no longer at a location associated with the event (e.g., a location of a boulder), and/or that data triggering the event no longer falls below or exceeds the threshold or thresholds that triggered the event. If the event is complete, then the process 500 proceeds to the block 512. Otherwise, the process 500 returns to the block 508.

In the decision block 512, the vehicle computer 104 determines whether the process 500 is to continue, i.e., whether to continue checking for trigger events and logging event data when a trigger event is detected. The vehicle computer 104 could make this determination based on whether the vehicle 102 has reached a pacified destination of a route, a user has provided input stopping the process and/or indicating that a destination has been reached, and/or when a vehicle 102 is stopped for more than a specified amount of time, and/or when a vehicle 102 is powered off. If the process 500 is to continue, then the process 500 returns to the block 506. Otherwise, the process 500 proceeds to a block 514.

In the block 514, a guidance data set for the route is created or generated. Typically, this is done at a central server, to which logged data from the vehicle computer 104 can be uploaded. For example, a user interface 200 such as shown in FIG. 2 could be used to identify guidance data and/or specified recommended operating parameters. Alternatively or additionally, a machine learning program could be used to generate guidance data. For example, a deep neural network (DNN) or the like could be trained with data such as input by operators at a location of interest (e.g., braking, acceleration, steering etc.), and/or vehicle settings such as a gear selection to then output specified operating parameters, e.g., a recommended speed, steering angle, etc., based on scores or ratings for operators providing the input data, with which the input data could be tagged. Further, machine learning could be used to identify similar locations of interest, e.g., even if no data has been received for a specified location of interest, a machine learning program could identify that location of interest as similar to another location of interest for which data was available, e.g., based on features such as a rate of include, type of travel surface, presence of running or standing water, etc. Yet further alternatively or additionally, data could be gathered from a plurality (e.g., tens, hundreds, or even thousands) of operators traversing a route. Various statistical measures, e.g., means, medians, etc., could be applied to data such as speed, acceleration, steering angle, etc., to provide guidance data. In one approach, data from operators could be provided to a central computer 120 based on crowd-sourcing, i.e., the computer 104 could be programmed to request operators to submit data to the computer 120 when traversing a route.

Following the block 514, the process 500 ends.

In addition or as an alternative to providing output based on guidance data via a vehicle HMI 106, a vehicle computer 104 could actuate one or more vehicle subsystems 110 to provide output is provided via an operator control in the second vehicle 102. For example, if guidance data recommended a path necessitating a change in vehicle 102 steering angle to the left, as an alternative or in addition to providing a display via the HMI 106, the vehicle computer 104 could actuate or instruct actuation of a vehicle 102 steering wheel to vibrate or move in a leftward direction. Similarly, haptic feedback or the like could be provided, e.g., a gear shift lever could vibrate to recommend changing gears, a brake pedal could vibrate to suggest braking, etc.

Figure 6:
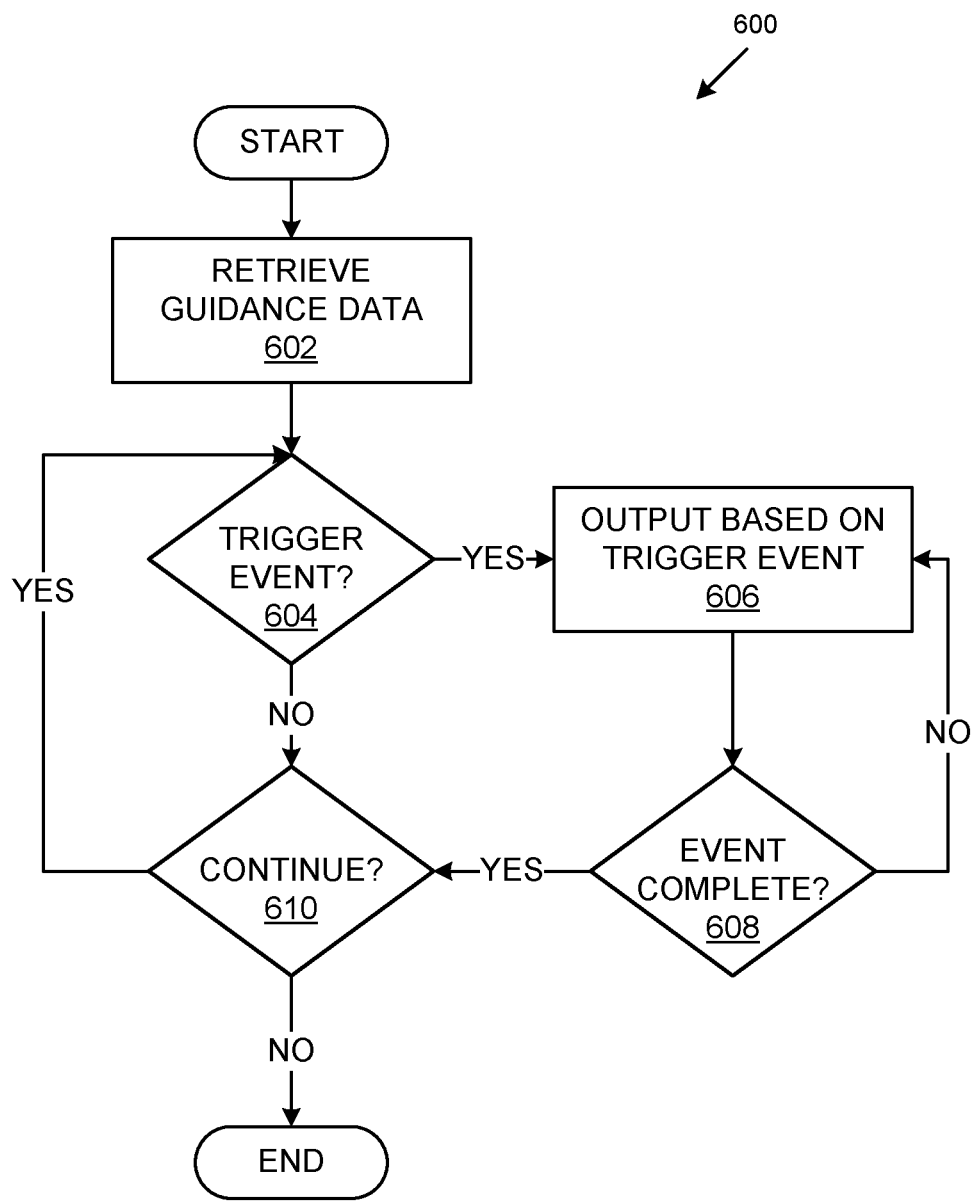
FIG. 6 illustrates an example process for a vehicle to use guidance data along a route.

FIG. 6 illustrates an example process for a vehicle 102 to use guidance data along a route.

The process 600 can begin in a block 602, in which a vehicle computer 104 retrieves guidance data that has been stored in a vehicle computer 104 memory, e.g., downloaded from a central server. For example, user input could specify that a vehicle 102 is beginning a route at a specified location, and the vehicle computer 104 could retrieve and activate the guidance data for a route beginning at that location. Alternatively or additionally, the vehicle computer 104 programmed to retrieve guidance data based on determining that the vehicle 102 is at a location matching (or with in a predetermined distance, e.g., 100 meters) of a route origin.

Next, in a decision block 604, the vehicle computer 104, while the vehicle 102 is traveling along the route, determines whether a trigger event is identified. A trigger event could be identified as described above; typically, in the case of a vehicle 102 using guidance data, a trigger event can be a determination that the vehicle 102 is at or proximate to (i.e., within a predetermined distance such as five meters, 10 meters, etc.) of a location of interest. If a trigger event is identified, then a block 606 is executed next. Otherwise, the process 600 proceeds to a block 610.

In the block 606, the vehicle computer 104 provide output, e.g., of recommended operating parameters based on the guidance data. For example, as shown in FIGS. 3 and 4, the vehicle computer 104 can provide a display showing a projected current path 302, the recommended path 304, a recommended speed, steering angle, etc. Alternatively or additionally, a vehicle computer could be programmed to instruct one or more vehicle subsystems based on one or more operating parameters in guidance data. For example, a vehicle computer could instruct a vehicle braking subsystem and/or propulsion subsystem to limit vehicle speed to a maximum speed specified by an operating parameter for a location of interest.

Next, in the block 608, the vehicle computer 104 determines whether the event is complete. Typically, this determination can be made by determining whether the vehicle 102 remains proximate to, i.e., within a predetermined distance of, a location of interest that triggered the event, as explained above. If the event is not complete, then the process 600 returns to the block 606. Otherwise, the process 600 proceeds to the block 610.

In the block 610, the vehicle computer 104 determines whether the process 600 is to continue. For example, if a destination location of a route is reached, a vehicle 102 is powered off, etc., then a determination can be made not to continue, and the process 600 ends. Otherwise, the process 600 returns to the block 604.

CONCLUSION

Computer executable instructions may be compiled or interpreted from computer programs created using a variety of programming languages and/or technologies, including, without limitation, and either alone or in combination, Java, C, C, Visual Basic, Java Script, Perl, HTML, etc. In general, a processor e.g., a microprocessor receives instructions, e.g., from a memory, a computer readable medium, etc., and executes these instructions, thereby performing one or more processes, including one or more of the processes described herein. Such instructions and other data may be stored and transmitted using a variety of computer readable media. A file in a networked device is generally a collection of data stored on a computer readable medium, such as a storage medium, a random access memory, etc. A computer readable medium includes any medium that participates in providing data e.g., instructions, which may be read by a computer. Such a medium may take many forms, including, but not limited to, non-volatile media and volatile media. Instructions may be transmitted by one or more transmission media, including fiber optics, wires, wireless communication, including the internals that comprise a system 100 bus coupled to a processor of a computer. Common forms of computer-readable media include, for example, RAM, a PROM, an EPROM, a FLASH-EEPROM, any other memory chip or cartridge, or any other medium from which a computer can read.

The adjectives first and second are used throughout this document as identifiers and, unless explicitly stated otherwise, are not intended to signify importance, order, or quantity.

In the drawings, the same reference numbers indicate the same elements. Further, some or all of these elements could be changed. With regard to the media, processes, systems 100, methods, etc. described herein, it should be understood that, although the steps of such processes, etc. have been described as occurring according to a certain ordered sequence, unless indicated otherwise or clear from context, such processes could be practiced with the described steps performed in an order other than the order described herein. Likewise, it further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A system comprising:
a first computer for a first vehicle comprising a first computer processor and a first computer memory, the first computer memory storing first instructions executable by the first computer processor to:
monitor first vehicle sensor data as the first vehicle traverses a route;
identify a location of interest along the route based on a topographic feature of the location of interest determined from the first vehicle sensor data; and
store a selected subset of the first vehicle sensor data for the location of interest in a set of collected data about the route, wherein the selected subset of the vehicle sensor data includes at least one of accelerometer data, wheel slip data, all-wheel drive data, steering angle, tire size, tire type, tire pressure, throttle position, gear selection, wheel-load, drive train torque, a state of charge of a traction battery, or a temperature of a traction battery; and
a second computer comprising a second computer processor and a second computer memory, the second computer memory storing second instructions executable by the second computer processor to:
receive the collected data about the route; and
based on the collected data about the route, generate a set of guidance data including one or more recommended operating parameters for the location of interest, whereby the recommending operating parameters are available to a third computer for a second vehicle.

2. The system of claim 1, wherein the selected subset of the first vehicle sensor data for the location of interest is selected based on the topographic feature of the location of interest determined from the first vehicle sensor data.

3. The system of claim 1, wherein the topographic feature at the location of interest is user input received for the location of interest via a microphone, touchscreen, or camera in the vehicle.

4. The system of claim 1, wherein the first computer further includes first instructions to, upon identifying the location of interest, output a prompt for a vehicle occupant to input data about the location of interest.

5. The system of claim 1, wherein the topographic feature at the location of interest is determined from at least one of accelerometer data, wheel slip data, all-wheel drive data, steering angle, throttle position, gear selection, wheel-load, rain sensor data, or drive train torque.

6. The system of claim 1, wherein the selected subset of the vehicle sensor data includes at least one of a location coordinate of the location of interest, and a camera image including the location of interest.

7. The system of claim 1, wherein the recommended operating parameters include at least one of speed, steering angle, gear selection, or a throttle position associated with the location of interest.

8. The system of claim 1, wherein the first computer further includes second instructions to identify a second location of interest, in addition to the first location of interest, based on a second topographic feature of the second location of interest determined from the first vehicle sensor data.

9. The system of claim 7, wherein the second computer further includes second instructions to, based on the collected data about the route, include in the guidance data a set of one or more recommended operating parameters for the second location of interest.

10. The system of claim 7, wherein the second location of interest is one of a plurality of second locations of interest.

11. The system of claim 1, wherein the second computer further includes second instructions to provide a user interface to include in the guidance data an association of the recommended operating parameters with the location of interest.

12. The system of claim 1, wherein the second computer further includes second instructions to provide a user interface to receive user input about the location of interest for inclusion in the guidance data.

13. The system of claim 1, further comprising the third computer for the second vehicle, including a third computer processor and a third computer memory, the third computer memory storing third instructions executable by the third computer processor to:
store the guidance data for the route;
and provide output in the second vehicle based on the guidance data as the second vehicle travels along the route.

14. The system of claim 13, wherein the output is based on one or more of the recommended operating parameters.

15. The system of claim 13, wherein the output includes a steering angle based on the recommended operating parameters and a current steering angle.

16. The system of claim 13, wherein the output includes a suggested path for the second vehicle based on the one or more recommended operating parameters.

17. The system of claim 13, wherein the output includes a recommendation based on one or both of a traction battery state of charge and a traction battery temperature included in the recommended operating parameters.

18. The system of claim 13, wherein the output is provided via a human-machine interface in the second vehicle.

19. The system of claim 13, wherein the output is provided via an operator control in the second vehicle.

* * * * *